United States Patent
Raposo et al.

(10) Patent No.: US 6,782,925 B2
(45) Date of Patent: Aug. 31, 2004

(54) CONCRETE RECOVERY METHOD AND SYSTEM

(75) Inventors: Manuel Marques Raposo, Vancouver (CA); Ilmud Dean, Burnaby (CA); Rudie Allen Dobchuk, Port Moody (CA)

(73) Assignee: BMP Environmental Group, Inc., Laguna Nigel, CA (US)

(*) Notice: Subject to any disclaimer, the term of this patent is extended or adjusted under 35 U.S.C. 154(b) by 1 day.

(21) Appl. No.: 10/282,618

(22) Filed: Oct. 28, 2002

(65) Prior Publication Data

US 2003/0079796 A1 May 1, 2003

Related U.S. Application Data

(60) Provisional application No. 60/339,902, filed on Oct. 30, 2001.

(51) Int. Cl.[7] ............................................... B05B 31/00
(52) U.S. Cl. .............................. 141/5; 141/11; 141/63; 141/70

(58) Field of Search ........................... 141/5, 7, 11, 63, 141/64, 69, 70; 134/22.18, 99.1

(56) References Cited

U.S. PATENT DOCUMENTS

| | | | |
|---|---|---|---|
| 5,009,508 A | * | 4/1991 | Wojdylo ...................... 366/10 |
| 5,433,519 A | | 7/1995 | Irsch |
| 6,155,277 A | | 12/2000 | Barry |
| 6,418,948 B1 | | 7/2002 | Harmon |

* cited by examiner

*Primary Examiner*—Gregory L. Huson
*Assistant Examiner*—Peter deVore
(74) *Attorney, Agent, or Firm*—Duckor Spradling & Metzger; Bernard L. Kleinke

(57) ABSTRACT

According to certain embodiments of the present invention, there is disclosed herein a method and system of recovering concrete which includes admitting a concrete slurry to a tank, pressurizing the tank with a fluid under pressure, discharging through a discharge line the pressurized fluid-slurry from the tank, cleaning the tank by admitting a cleaning liquid into the tank after discharging fluid-slurry therefrom, and discharging the cleaning liquid from the tank through the discharge line for cleaning purposes.

12 Claims, 2 Drawing Sheets

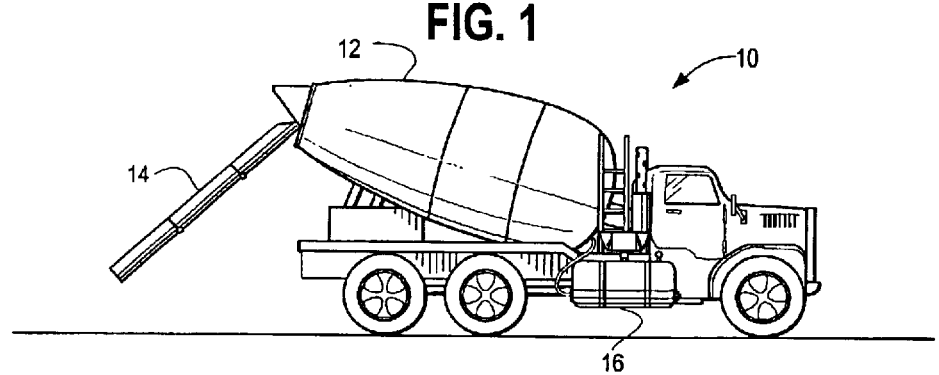
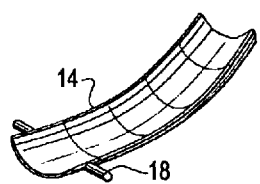
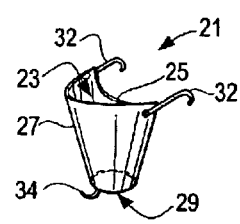
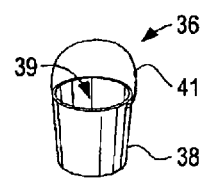
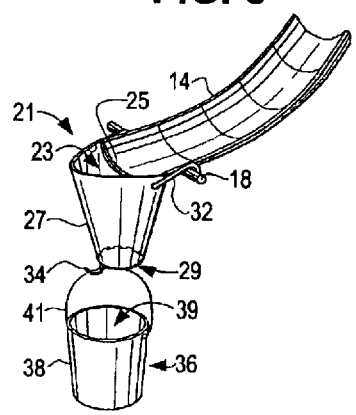
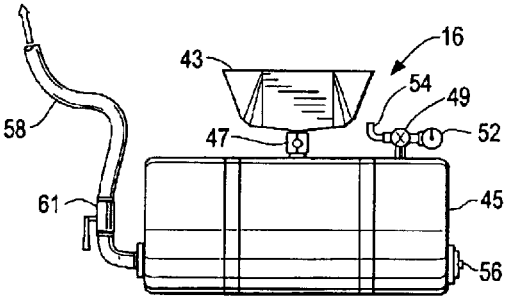

CONCRETE RECOVERY METHOD AND SYSTEM

RELATED APPLICATION

This application claims priority to U.S. provisional patent application Serial No. 60/339,902, filed Oct. 30, 2001, and entitled CONCRETE RECOVERY SYSTEM, which is incorporated herein by reference.

BACKGROUND OF THE INVENTION

1. Field of the Invention

The present invention relates generally to a method and system for the recovery of concrete. In particular, the invention relates to a method and system for the recovery of unused concrete material in a concrete slurry in a relatively efficient and effective manner.

2. Background Art

It is to be understood that there is no intention of an admission that any of the background art discussed in this section legally constitutes prior art.

Concrete is frequently delivered to a construction site in a concrete mixer truck. The truck has a rotating drum in which the components of concrete are mixed en route to the site. At the site, the concrete is poured from the drum onto a surface through a chute, which is typically part of the mixer truck. Once the delivery of the concrete is complete, however, the chute and other components may be coated with residual concrete material. This residual concrete material should, in many instances, be cleaned off of the chute and any other components in order to prevent hardening of the concrete in place on the components.

In cleaning the chute and other components, the runoff of the cleaning process shall be controlled for at least some applications. For example, it is desirable to prevent or limit the runoff from merely running onto the ground as the runoff materials may constitute a serious environmental hazard. Further, the runoff materials may constitute lost resources to the concrete provider.

One approach to recover concrete materials employ the use of a pressurizable tank which could be mounted on board a concrete mixer truck so that the runoff materials could be collected in a suitable container such as a bucket and then transferred to the tank. A strainer or filter at the inlet would remove larger particulate materials from the runoff so that the remaining concrete slurry is then admitted to the tank. The tank would then be pressurized, and a discharge line from the tank would re-circulate the pressurized slurry back into the truck mixing tank to safely recover the cementitious materials.

While such a system is effective and relatively inexpensive to manufacture, it has been suggested that the use of the manually carried container could be difficult or even dangerous for the operator. Also, for some applications, the valves used in controlling the pressurizing and discharging of the fluids from the recovery tank could become clogged by the slurry materials. Furthermore, there has been a concern that it could be, in some instances, difficult to pressurize the tank, and thus the relatively lower pressure level would, in certain applications, preclude the discharging of the entire contents of the tank, and thus unwanted materials could remain therein, and the valve clogging concerns could become exacerbated. In an attempt to overcome these concerns, as disclosed in U.S. Pat. No. 6,155,277, which is incorporated herein by reference, a pump was mounted on board the concrete mixing truck to re-circulate the filtered cementitious runoff back into the mixing drum of the truck. However, such pumps are necessarily quite expensive, and bulky to mount on the truck. Also, the pump is a suction-type pump which could become damaged by cementitious debris, thereby running the risk of necessitating expensive repairs or replacements.

Other attempts at addressing the problem of concrete reclamation, have been proposed in U.S. Pat. Nos. 3,997,434; 4,154,671 and 5,778,910, each of which is incorporated herein by reference. However, all of these patented techniques disclose relatively expensive techniques for concrete reclamation.

BRIEF DESCRIPTION OF THE DRAWINGS

The various features and advantages of the present invention will become more clearly appreciated as a detailed description of certain embodiments is given with reference to the appended drawings in which;

FIG. 1 is a side elevational view of a concrete recovery system, which is constructed according to an embodiment of the present invention, and which is installed on a concrete mixer truck;

FIG. 2 is an enlarged pictorial view of a chute illustrated in FIG. 1;

FIG. 3 is an enlarged pictorial view of a funnel for attachment to the chute of FIG. 2;

FIG. 4 is an enlarged pictorial view of a bucket for attachment to the funnel of FIG. 3;

FIG. 5 is an enlarged pictorial view of the bucket of FIG. 4 attached to the funnel of FIG. 3 suspended from the chute of FIG. 2;

FIG. 6 is an enlarged side elevational view of one embodiment of a slurry recovery tank which forms a part of the system of FIG. 1.

DETAILED DESCRIPTION OF CERTAIN EMBODIMENTS OF THE INVENTION

Figure 7:
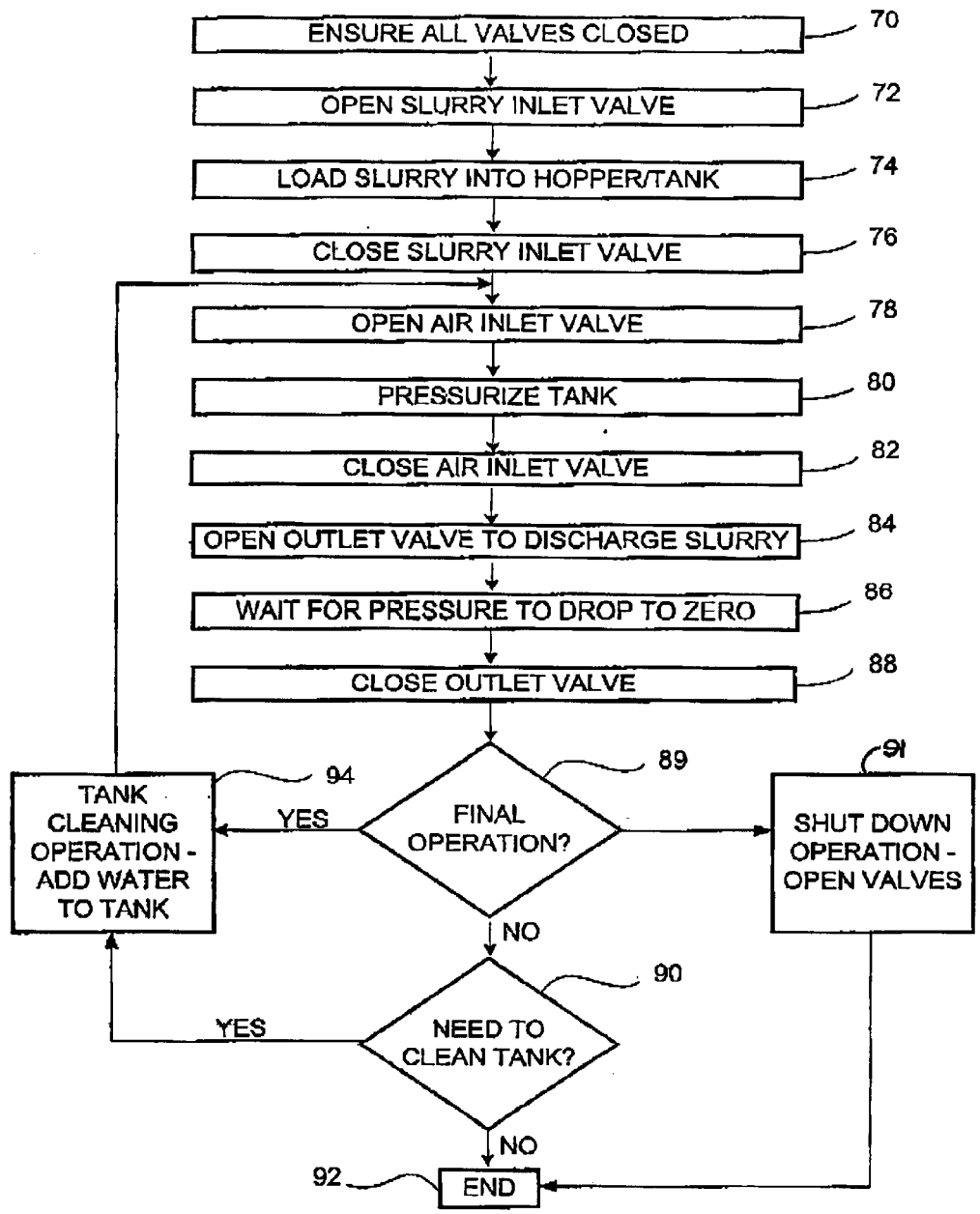
FIG. 7 is a flow chart diagram illustrating a concrete recovery method according to one embodiment of the invention.

According to certain embodiments of the present invention, there is disclosed herein a method and system of recovering concrete which includes admitting a concrete slurry to a tank, pressurizing the tank with a fluid under pressure, discharging through a discharge line the pressurized fluid-slurry from the tank, cleaning the tank by admitting a cleaning liquid into the tank after discharging fluid-slurry therefrom, and discharging the cleaning liquid from the tank through the discharge line for cleaning purposes.

In accordance with other embodiments of the present invention, there is provided a concrete recovery system, which includes a tank having a slurry inlet for admitting concrete slurry, having a pressurizing inlet for admitting a fluid under pressure to the interior of the tank for pressurizing it, having a discharge outlet connected in fluid communication with a discharge line for permitting the discharge of pressurized fluid-slurry from the tank, having a cleaning inlet for admitting a cleaning liquid to the interior of the tank after discharging fluid-slurry therefrom so that pressurized cleaning liquid can be discharged through the discharge line, and having a clean-out port to help remove unwanted materials from the tank.

In accordance with other embodiments of the present invention, the system and method of the present invention includes pressurizing the tank to about 40 pounds per square inch to help facilitate the entire removal of the contents of the tank. In the event that the tank is not entirely purged of the unwanted materials contained therewithin, a tank cleaning cycle of operation is commenced according to the previously mentioned method and system. Also, in order to maintain the tank and its valves in a clean condition when the system is not in use, a final operations method is employed as hereinafter described in greater detail.

The system and method of certain embodiments of the present invention employ a tank which is relatively inexpensive and which can be utilized for a dual purpose of concrete reclamation and of storing other materials such as water or chemicals. By employing the method and systems of the embodiments of the invention, the tank can be suitably pressurized to remove all or substantially all of the contents of the tank during the discharge mode of operation, and if the entire contents are not satisfactorily removed from the tank, the cleaning cycle of operation can be employed. Additionally, after the final operation, such as at the end of the day, the final operation method may be employed to maintain the tank and its valves in a relatively clean condition to facilitate the continued proper operation of the system and methods. The tank may be filled by a small container which has proven to be satisfactory for many or most all operators for filling the pressurizable tank for most operations.

Referring now to the drawings and more particularly to FIG. 1, a cement recovery system 9, which is constructed according to an embodiment of the invention, is installed on a concrete mixer truck 10. The truck 10 has a rotating drum 12 installed behind the driver's cab 13. The drum 12 rotates at a pre-selected rate to mix the concrete components en route to the site. The drum 12 may be tipped to assist in unloading of the concrete mixture in a conventional manner. A chute 14 is installed behind the drum 12 for delivery of the concrete from the drum 12 to the area to be surfaced with the concrete. At an upstream end, the chute 14 is adapted to receive concrete from the drum 12 in a conventional manner. At a downstream end, the chute 14 can be located near the surface to which concrete is to be delivered. The chute 14 may be removable during transit. The chute 14 may have a trough-like cross-section.

The cement recovery system 9 mounted on-board the truck 10 includes a concrete slurry recovery apparatus 16, which will be described in greater detail below with reference to FIGS. 6 and 7.

FIG. 2 is a detailed view of the downstream end of the chute 14. A funnel supporting pin 18 is provided on each side of the chute 14 near its downstream end. The pins 18 may have many forms. The pins 18 illustrated in FIG. 2 have the form of short cylindrical rods protruding from the sides of the chute.

FIG. 3 is a pictorial view of a funnel 21 for use with the chute 14. The funnel 21 has an inlet 23 at its upper end and an outlet 29 at its lower end. The funnel 21 may have a substantially body portion 27 that is substantially conical except for a cutout 25 in the body. The cutout 25 is located near the inlet 23 of the funnel 21. Thus, the inlet 23 may be substantially circular with one side of the circle cut out. The cutout 25 is shaped to fit the downstream end of the chute 14, as discussed below with reference to FIG. 5.

The funnel 21 is provided with two chute engagement hooks 32 attached to the funnel body 27 near the inlet 23. The chute engagement hooks 32 are located on the sides of the cutout 25 of the funnel body 27. The chute engagement hooks 32 may be either hinged to the funnel body 27 or may be permanently affixed.

The funnel 21 is also provided with a bucket support hook 34 near its outlet 29. The bucket support hook 34 is preferably located on the side of the funnel body 27 directly opposite that on which the cutout 25 is located.

FIG. 4 illustrates a bucket 36 for use with the chute 14 and the funnel 21 described above. The bucket 36 has a container portion 38 with an opening 39. The container portion 38 may be of any shape capable of holding a liquid. The bucket 36 is also provided with a handle 41 connected to the container portion 38 near the opening 39.

FIG. 5 illustrates the attachment of the funnel 21 and the bucket 36 to the chute 14 of the concrete mixer truck 10. The chute engagement hooks 32 of the funnel 21 are hooked around the funnel support pins 18 on each side of the chute 14 near its downstream end. When the hooks 32 engage the pins 18, the cutout 25 in the funnel body 27 fits snuggly with the end of the funnel. Thus, the shape of the cutout 25 matches the cross-sectional shape of the chute 14. The bucket 36 is mounted to the funnel 21 by placing the handle 41 on the bucket support hook 34 of the funnel 21.

In this configuration, when water is sprayed onto the chute 14 or other upstream components as part of the cleaning process, the runoff from the chute 14 is captured by the funnel 21 through the inlet 21. The runoff is directed by the funnel body 27 through the funnel outlet 29 and into the bucket 36 hanging below. Thus, the runoff can be collected in the container portion 38 of the bucket 36. It is understood, however, that the runoff may be collected in any container used in place of the bucket 36 hung below the funnel 21.

FIG. 6 illustrates one embodiment of an apparatus for recovering the concrete slurry collected in the runoff. The recovery apparatus 16 may be mounted on the concrete mixer truck 10, as illustrated in FIG. 1. Alternatively, according to other embodiments of the invention, the recovery apparatus 16 may be located in a centralized location for use by one or more trucks.

The slurry recovery apparatus 16 comprises a hopper 43 into which the slurry from the runoff may be loaded by means, for example, by the operator manually carrying the bucket 36 containing the runoff from the funnel 21 to the apparatus 16. The hopper 43 has a large opening in its top portion and has a funnel-like bottom portion 44. The runoff may contain larger particles such as rock and sand as well as the concrete slurry. These larger particles may be separated from the slurry in numerous ways. According to one example, a screen (not shown) may be mounted in the hopper 43 to capture the larger particles while allowing the slurry to pass through. According to another example of the invention, since the larger particles tend to settle to the bottom, a worker pouring the slurry into the hopper may monitor the pouring to keep the larger particles in the bucket 36, to prevent them from entering the hopper 43.

Referring to FIGS. 1 and 6, the slurry recovery apparatus 16 includes a pressurizable tank 45. The tank 45 may be sized for various purposes. For example, the tank may be sized and shaped to be mounted onto the concrete mixer truck 10, as illustrated in FIG. 1, or may be made larger as a stationary unit (not shown) to accommodate slurry recovery from a multitude of trucks. The tank 45 is preferably made of a metallic material or other suitable materials capable of safely maintaining a predetermined level of air pressure within.

A slurry inlet valve 47 is provided between the hopper 43 and the tank 45. The slurry inlet valve 47 is connected to the hopper at the bottom of the funnel-like bottom portion 44. The slurry inlet valve 47 may be closed to prevent communication between the hopper 43 and the tank 45 to seal the tank 45 when it later becomes pressurized, or be opened to allow slurry to be loaded from the hopper 43 into the tank 45.

An air inlet valve 49 controls the flow of air under pressure into the tank 45 from a source of air under pressure (not shown) through an air regulator 50, a tee connector 51, and an air supply line 53 to the valve 49, which is connected in fluid communication with an air inlet 55 to the tank 45. In the embodiment of the slurry recovery apparatus 16 illustrated in FIG. 6, the air inlet valve 49 and the air inlet 55 are located near the top of the tank 45. The air pressure source may be capable of supplying a predetermined level of air pressure and is preferably controlled by the regulator 50. The level of air pressure within the tank 45 may be indicated to a user by a pressure gauge 52 mounted on the tank at the valve 49. A pop off or pressure relief valve 54 may be connected in fluid communication at the tee 51 to prevent or at least reduce the possibility of over-pressurization of the tank 45 and is set at about 74 psi.

The tank 45 has a cleaning water inlet 56 located near the bottom of one side of the tank 45 to facilitate a tank cleaning cycle of operation. A cleaning liquid such as water under pressure may be supplied into the tank 45 from a water source (not shown) through a valve 57 and a water supply line 59. The water source may be, for example, another tank mounted on the concrete mixer truck 10, or other convenient source of water under pressure.

A recovery discharge outlet pipe 58 is connected in fluid communication with the tank 45 through an outlet valve 61. The recovery outlet pipe 58 extends from the tank 45 to a recovery reservoir such as, for example, the rotating drum 12 of the mixer truck illustrated in FIG. 1, or other suitable disposal site.

For tank cleaning purposes, in accordance with one embodiment of the present invention, the tank 45 is provided with a large removable clean-out port 64 which is fitted into a large clean-out opening in the bottom of the tank 45. A drain valve 66 is connected in fluid communication with a smaller opening in the port 64 via a stub line 68 to drain unwanted residue materials from the tank 45 via a drain line 71 to a safe disposal location. The port 64 can be removed to gain access to the interior of the tank 45 for cleaning purposes.

FIG. 7 is a flow chart illustrating the process by which a slurry recovery apparatus, such as the one illustrated in FIG. 6, recovers concrete slurry. At block 70, a user ensures that all valves leading to the tank 45 are closed. For example, the air inlet valve 49 and the recovery outlet valve 61, as well as the valves 57 and 66, must be closed. At block 72, the slurry inlet valve 47 is opened to allow communication between the hopper 43 and the tank 45.

At block 74, slurry is loaded into the hopper 43. As noted above, the slurry may be separated from larger components such as rock and sand in several ways. Thus, only the slurry is loaded into the hopper and, via the slurry inlet valve, into tank 45. Once the slurry has been loaded into the tank 45, the slurry inlet valve 47 is closed (block 76) to seal off the interior of the tank 45.

At block 78, according to an embodiment of the invention, the air inlet valve 49 is opened, and the tank 45 is pressurized (block 80). The level of pressurization may be predetermined to an appropriate level under the control of the regulator 50. In one embodiment of the invention, a tank pressure of about 40 pounds per square inch (psi) is used to provide sufficient pressure to propel the air-slurry mixture from the tank 45, resulting in the discharge of substantially the entire slurry from the tank 45 to maintain it in a clean condition. The regulator 50 controls the pressure to a maximum of about 40 psi.

Once the desired pressure is reached, the air inlet valve 49 is closed, at block 82, and the recovery outlet valve 61 is opened (block 84). The air pressure in the tank 45 propels the air-slurry mixture through the recovery outlet pipe 58 and into, for example, the drum 12 of the cement mixer truck 20, or other safe location.

Once all or substantially all of the slurry has been discharged from the tank 45, with the recovery outlet valve still open, the pressure in the tank 45 drops. After waiting for the pressure to drop to near zero (block 86), the recovery outlet valve 61 is closed (block 88).

It is determined at block 89 whether or not this is the final operation for this time period such as at the end of the day. If it is the final operation, then a tank cleaning operation is commenced as indicated at block 94.

In accordance with an embodiment of the invention, the tank cleaning operation includes opening the valve 57 to permit a sufficient quantity of water under pressure to flow through the pipe 59 and through the inlet 56 and into the interior of the tank 45. The valve 47 is opened during this operation to vent the tank 45. Thereafter, the valves 57 and 47 are closed, and the cycle is repeated starting at the block 78.

The air inlet valve is opened to admit air under pressure into the tank to again pressurize the tank 45 (block 80) to a pressure of about 40 psi preferably (block 82). The air inlet valve is then closed, and the outlet valve 61 is then opened block 84, to flush the contents of the tank 45 therefrom for cleaning purposes. Thereafter, the pressure within the tank 45 is permitted to decrease substantially to zero (block 86). The discharge outlet valve 61 is then closed, and the equipment is inspected to determine whether or not another cleaning cycle of operation is required to be repeated. If so then water is again added (block 94) and the cycle of operation is repeated at block 78.

It should be understood that if the critical pressure of about 40 psi is achieved to pressurize the tank 45, little or no cleaning is required for many or most applications. However, as indicated previously, if cleaning of the tank 45 is desired, then the tank cleaning operation may be employed.

At the final operation for the period such as at the end of the day, according to an embodiment of the invention, once the tank 45 is cleaned, then the discharge valve 61 remains open, and the drain valve 66 is opened and remains open with the valve 61 until the next period such as the next day when the operation will begin again. This enables the discharge line 58 and the tank 45 to drain during a period of non-use such as over night, thereby avoid or at least reducing slurry build up. Thus, the cycle of operation ends as indicated at block 92.

If at block 89, it is alternatively decided that this is not the final operation, then a determination is made whether or not the tank 45 requires cleaning (block 90), since, for example, the tank may require cleaning mid-day as well.

Thus, at block 90, if it is assumed that this is not the final operation, the user will then determine whether, for any reason, the tank 45 and the recovery outlet pipe 58, for example, require cleaning. If no further cleaning is required, the slurry recovery process ends at block 92. If, on the other hand, it is determined that, for example, the tank 45 or the recovery outlet pipe 58 requires cleaning, a tank cleaning cycle of operation is performed commencing with adding water to the tank 45 through the water inlet 56 (block 94), in accordance with an embodiment of the invention. The process is then repeated from block 78 until no further cleaning is required.

According to another embodiment of the invention, in the event of a blockage of the system, the valves 47, 61 and 66 are opened to vent the system, and then the port 64 is removed to permit access to the interior of the tank to permit removal of the blockage.

While particular embodiments of the present invention have been disclosed, it is to be understood that various different modifications and combinations are possible and are contemplated within the true spirit and scope of the invention. There is no intention, therefore, of limitations to the exact abstract or disclosure herein presented.

What is claimed is:

1. A method of recovering concrete, comprising: admitting a concrete slurry to a tank; pressurizing the tank with a fluid under pressure; discharging through a discharge line the pressurized fluid-slurry from the tank; cleaning the tank by admitting a cleaning liquid into the tank after discharging fluid-slurry therefrom; and discharging the cleaning liquid from the tank through the discharge line for cleaning purposes.

2. A method of recovering concrete according to claim 1, wherein said step of pressuring includes pressuring the tank to about 40 pounds per square inch.

3. A method of recovering concrete according to claim 2, wherein said pressurizing the tank to about 40 pounds per square inch includes using a pressure regulator to regulate the pressure to a maximum pressure of about 40 pounds per square inch.

4. A method of recovering concrete according to claim 1, wherein the step of admitting a cleaning liquid includes opening a valve.

5. A method of recovering concrete according to claim 4, wherein said cleaning liquid is water, and further including permitting water under pressure to flow into the tank through said open valve.

6. A method of recovering concrete according to claim 1, wherein said discharging the cleaning liquid includes sealing the tank and admitting air under pressure into the sealed tank to pressurize it.

7. A method of recovering concrete according to claim 6, wherein said discharging the cleaning liquid includes opening a valve to release the pressure within the tank to propel the cleaning liquid therefrom.

8. A method of recovering concrete according to claim 5, further including venting the tank while water under pressure is flowing into the tank.

9. A method of recovering concrete according to claim 1, further including cleaning the tank following a final operation, and then performing a shutting down operation.

10. A method of recovering concrete according to claim 9, wherein said shutting down operation includes opening valves for the tank and permitting them to remain open until operation commences again.

11. A method of recovering concrete according to claim 1, further including opening a drain valve to permit cleaning liquid to drain from the tank.

12. A method of recovering concrete according to claim 1, further including opening a clean-out port in the tank to permit access to the interior thereof for cleaning purposes.

* * * * *